United States Patent [19]

Toyoda et al.

[11] 4,425,255

[45] Jan. 10, 1984

[54] REGENERATION METHOD OF CATALYSTS

[75] Inventors: Yoshiaki Toyoda, Takaishi; Yoshihiro Ikeda, Izumi; Nobumasa Arashiba, Takaishi, all of Japan

[73] Assignee: Mitsui Toatsu Chemicals, Inc., Tokyo, Japan

[21] Appl. No.: 380,738

[22] PCT Filed: Sep. 18, 1981

[86] PCT No.: PCT/JP81/00238
§ 371 Date: May 13, 1982
§ 102(e) Date: May 13, 1982

[87] PCT Pub. No.: WO82/00961
PCT Pub. Date: Apr. 1, 1982

[30] Foreign Application Priority Data

Sep. 20, 1980 [JP] Japan .............................. 55-130087

[51] Int. Cl.³ ...................... B01J 20/02; B01J 20/16
[52] U.S. Cl. ............................... 502/38; 260/465.3; 502/53
[58] Field of Search ............................ 252/416, 411; 260/465.3

[56] References Cited

U.S. PATENT DOCUMENTS 2,338,881  1/1944  Thomas ............................... 252/416
2,973,326  2/1961  Hodgins et al. ..................... 252/412
4,052,333  10/1977  Lee .................................... 260/465.3

OTHER PUBLICATIONS

Ruo et al, "Physicochemical Studies on Silica-Supported Multicomponent Molybdate Catalyst before and after Use in Ammoxidation of Propylene", Journal of Catalysis, vol. 51, pp. 64-71, 1978.

Primary Examiner—Delbert E. Gantz
Assistant Examiner—Chung K. Pak
Attorney, Agent, or Firm—Fisher, Christen & Sabol

[57] ABSTRACT

A method for regenerating a catalyst containing molybdenum as an active component comprising subjecting a catalyst, which has been deactivated through the use for a reaction, with or without a molybdenum source added thereto, to a heat treatment in a reducing gas atmosphere under specific temperature conditions and then subjecting same to a further heat treatment in a gaseous atmosphere containing molecular oxygen and at specific temperature conditions.

12 Claims, No Drawings

REGENERATION METHOD OF CATALYSTS

CROSS-REFERENCES TO OTHER APPLICATIONS

This application is a national stage application of international application No. PCT/JP81/00238, filed September 18, 1981, which in turn claims the benefit of Japanese application No. 130087/1980, filed September 20, 1980.

TECHNICAL FIELD

This invention relates to a method for regenerating a deactivated molybdenum-containing catalyst. More particularly, it relates to a method suitable for regenerating a catalyst which contains molybdenum as an active component and is used in producing an $\alpha,\beta$-unsaturated nitrile, especially, acrylonitrile or methacrylonitrile through the direct gas phase catalytic ammoxidation of an olefin, especially, propylene or isobutylene with molecular oxygen and ammonia.

BACKGROUND ART

A number of catalysts containing molybdenum as an active component have been developed, particularly, as catalysts for gas phase catalytic oxidation and are extensively employed in actual production processes. These catalysts are very widely used, for example, in a process of producing acrylonitrile or methacrylonitrile by ammoxidizing propylene or isobutylene, a process for the production of acrolein or methacrolein through the oxidation of propylene or isobutylene, a process for preparing a carboxylic acid such as acrylic acid or methacrylic acid by oxidizing an unsaturated aldehyde such as acrolein or methacrolein or an olefin such as propylene or isobutylene, a process for producing 1,3-butadiene or conjugated diolefin through the oxidation and dehydrogenation of a butene or the like, etc. However, these catalysts exhibit gradual deactivation in the course of use or, in some instances, considerable deactivation in a strongly reducing atmosphere.

In such situations, it has conventionally been a routine practice to maintain the conversion above a predetermined level by replacing a deactivated catalyst with a fresh catalyst. Several methods have been proposed for the regeneration of such a deactivated catalyst. For example, in Japanese Patent Laid-open No. 49201/1975, there is proposed a method for regenerating an oxidizing catalyst by contacting it in a fluidized-bed reactor with fluidized particles consisting of a substantially inert carrier containing molybdenum without interrupting the reaction, considering that one of the paths of the deactivation stems from the loss of molybdenum while the reaction proceeds. In U.S. Pat. No. 4052332, there is proposed a method of regenerating a deactivated catalyst by impregnating same with at least molybdenum and bismuth and then calcining same. East German Pat. No. 137889 proposes a method for regenerating a deactivated catalyst by adding to it one or more components selected from Bi, Cr, Mn, Fe, Co or Ni and then calcining same. However, although the metallic component practically lost from deactivated catalyst is generally molybdenum only, the methods proposed in the above publications require an addition of metallic components other than molybdenum, whereby losing the balance among its components of the optimum catalyst composition, which is adjusted initially and making it difficult to achieve the regeneration effect continually in a repeated fashion. However, it is extremely uneconomical from the practical point of view to charge a fresh catalyst repeatedly.

An object of this invention is to provide a method for regenerating a catalyst which contains molybdenum as an active component and which has been deactivated through use for reaction.

DISCLOSURE OF THE INVENTION

The present invention provides the following method for regenerating a molybdenum-containing catalyst:

A method for regenerating a catalyst containing molybdenum as an active component comprising subjecting the catalyst, which has been deactivated through use for a reaction, with or without a molybdenum source added thereto to a heat treatment in a reducing gaseous atmosphere and at a temperature of from 200° to 700° C. and then calcining same in a gaseous atmosphere containing molecular oxygen at a temperature of from 550° to 700° C.

BEST MODE OF THE INVENTION

The regeneration of a catalyst containing molybdenum as an active component according to this invention can be generally applied, as mentioned above, to the regeneration of oxidation catalysts containing molybdenum as an active component such as ammoxidation catalysts for producing $\alpha,\beta$-unsaturated nitriles such as acrylonitrile, methacrylonitrile and the like from an olefin such as propylene, isobutylene or the like as well as oxygen and ammonia; oxidation catalysts for preparing $\alpha,\beta$-unsaturated aldehydes such as acrolein, methacrolein and the like from an olefin such as propylene, isobutylene or the like and oxygen; oxidation catalysts for producing $\alpha,\beta$-unsaturated carboxylic acids such as acrylic acid, methacrylic acid and the like from an unsaturated aldehyde such as acrolein, methacrolein or the like or an olefin such as propylene, isobutylene or the like and oxygen; oxidation and dehydrogenation catalysts for producing a conjugated diolefin such as 1,3-butadiene, isoprene or the like from an olefin such as 1-butene, cis- or trans-2-butene, 3-methyl-1-butene and oxygen, etc. The above method exhibits excellent effects, particularly, in regenerating a catalyst which contains molybdenum as an active component and is used in producing a $\alpha,\beta$-unsaturated nitrile, especially, acrylonitrile or methacrylonitrile by subjecting an olefin, especially propylene or isobutylene to direct gas phase catalytic ammoxidation by molecular oxygen and ammonia. The method according to this invention can be applied to catalysts for both fixed and fluidized beds.

Where a molybdenum source is added in practising the present invention, metallic molybdenum, molybdenum oxides such as molybdenum dioxide, molybdenum trioxide and the like, the alkali metal salts of molybdic acid such as lithium molybdate, sodium molybdate, potassium molybdate and the like, the alkaline earth metal salts of molybdic acid such as magnesium molybdate, calcium molybdate, barium molybdate and the like, as well as the ammonium salt and organoamine salts of molybdic acid are employed. In addition, molybdenum compounds such as molybdenum chloride, molybdenum bromide and molybdenum fluoride as well as molybdenum sulfide, as well as molybdenum-containing composite oxides such as bismuth molybdate, iron molybdate, molybdophosphoric acid and the like may also be used. In the regeneration according to the present invention, it is extremely desirous to permit a repeated regeneration over a continuous use period, and also to avoid a situation in which, in a catalyst, components other than molybdenum are accumulatively increased through repeated regeneration by adding a molybdenum compound and the optimum proportions of its components, which proportions are present initially in the catalyst, are lost. Thus, it is more preferable to add molybdenum in the form of metallic molybdenum, molybdenum oxide or the ammonium or organoamine salt of molybdic acid which, upon calcining, leaves molybdenum oxide only, in order to enhance the effects of this invention.

It is desired to add the above-described molybdenum source to a deactivated catalyst to be applied with the regeneration treatment by dispersing the former in the latter as uniform as possible. Although the molybdenum source may be preferably added as an aqueous solution or an organic solvent solution, it may also be dispersed and incorporated in and kneaded with the deactivated catalyst in the form of fine powder. The solution may be directly added to the deactivated catalyst by spraying it onto the catalyst, or the deactivated catalyst to be treated may be immersed in the solution. The molybdenum source is added in the form of a solution to the deactivated catalyst, and the resulting treated catalyst is thereafter dried by heating in an electric drier or in a mixer equipped with a steam or oil jacket or similar equipment while being mixed. The treated catalyst may also be dried in a reduction treatment apparatus prior to subjecting it to a reduction treatment. Therefore, the drying operation may be conducted in any one of an air atmosphere, a reducing gas atmosphere or an inert gas atmosphere.

Reducing gases used for reduction treatment are selected from hydrogen, ammonia, carbon monoxide, various primary to tertiary alkylamines alkynes such as acetylene and the like, alkenes such as ethylene, propylene, butene, etc., and mixtures thereof. Suitable primary, secondary and tertiary alkylamines are of the formula

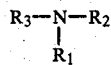

where $R_1$, $R_2$ and $R_3$ are the same or different and are H, $CH_3$ or $C_2H_5$ and at least one of $R_1$, $R_2$, or $R_3$ is not hydrogen. Specific examples of the alkylamines are methylamine, trimethylamine, ethylamine, diethylamine, and triethylamine. When applying a heat treatment, either one of these reducing gases may be used solely or in combination with a chemically inert gas such as, for example, helium, argon, nitrogen gas or carbon dioxide gas. The treatment temperature is from 200° to 700° C., and preferably 350° to 550° C. If it exceeds 700° C., the sintering of a catalyst becomes conspicuous and such a high temperature is thus not preferable. On the other hand, if it does not reach 200° C., the reducing velocity becomes extremely low and is unable to obtain practically meaningful effects. For the reduction treatment, it may be possible to use a separately-provided reduction apparatus, but the catalytic reaction apparatus may also be used without need for any alteration. As the reduction apparatus, an apparatus of any type such as fixed bed type, moving bed type or fluidized bed type may be adopted.

Regarding the sequence of the addition of the molybdenum source and the reduction treatment, no substantial difference is recognized in the regeneration effects to be achieved whichever is effected first. A slightly better result can be obtained when the reduction treatment is effected subsequent to the addition of the molybdenum component. In addition, the oxidizing calcining treatment is most convenient to be effected continuously subsequent to the reduction treatment in the same treatment apparatus. Thus, it is preferred to effect, first of all, the addition of the molybdenum component and then the reduction treatment, and finally followed by the oxidizing calcining treatment.

As a gas employed for effecting the oxidizing firing treatment, molecular oxygen or a gas containing molecular oxygen such as air or oxygen-enriched air can be used, among which it is most economical to use air. The condition of the calcining temperature ranges from 550° to 700° C., and more preferably is limited to 600° to 700° C. Below 500° C., the regeneration effects are not sufficient while, over 700° C., the sintering of the catalyst becomes remarkable and the evaporation of molybdenum, which is an effective component, becomes so great that it may no longer be ignored, thereby becoming unfit for the object of this invention.

The oxidizing calcining treatment can be effected uninterruptedly without causing the temperature of the catalyst to lower subsequent to effecting the heat treatment in the reducing gas atmosphere, by safely changing from the reducing gas to a gas containing molecular oxygen. Alternatively, it may be effected by once withdrawing the catalyst, to which the heat treatment has been applied in the reducing gas atmosphere, from the treatment apparatus and independently subjecting the catalyst to the oxidizing and calcining treatment. Namely, the steps from the heat treatment in the reducing gas atmosphere to the calcining by the molecular oxygen-containing gas can be suitably effected. The calcining in the gaseous atmosphere containing molecular oxygen may be carried out in the catalytic reaction apparatus. Alternatively, it may be effected continuously in the separately-provided heat treatment apparatus of the reducing gas atmosphere or may also be effected in an oxidizing calcining treatment apparatus provided separately in addition to the catalytic reaction apparatus and heat treatment apparatus. It is however necessary to pay attention to the control of temperature when calcining in the gaseous atmosphere containing molecular oxygen. Since the thus-reduced catalytic metal component gives off oxidation heat, it is preferable to calcine in a fluidized bed.

Effects of this invention will hereinafter be described by means of examples and comparative examples. The propylene conversion(%), acrylonitrile yield(%) and acrylonitrile selectivity(%) to be indicated in each of the examples are respectively defined as follows:

Propylene Conversion =

$$\frac{\text{Number of moles of propylene consumed}}{\text{Number of moles of propylene fed}} \times 100$$

Acrylonitrile Yield =

$$\frac{\text{Number of moles of acrylonitrile produced}}{\text{Number of moles of propylene fed}} \times 100$$

Acrylonitrile Selectivity =

$$\frac{\text{Number of moles of acrylonitrile produced}}{\text{Number of moles of propylene consumed}} \times 100$$

EXAMPLES (1) Measurement of Activity of Fresh Catalyst

A catalyst, which had been prepared by carrying on 50% by weight of silica, a molybdenum component represented by an experimental formula, $K_{0.1}Co_{4.5}Fe_3Ni_{2.5}BiP_{0.5}Mo_{12}O_x$ (wherein, x denotes the number of oxygen atoms determined by the valence of each of the other elements) was packed in a fluidized-bed reactor (inner diameter: 41 mm $\phi$), into which air, ammonia and propylene were fed at 435° C. in proportions of 10.0:1.1:1.0 (molar ratio) and caused to react. The propylene conversion, acrylonitrile yield and acrylonitrile selectivity were respectively 97.5%, 75.5% and 77.4%.

(2) Measurement of Activity of Deactivated Catalyst

A catalyst, which had been obtained by using the catalyst in the above item (1) for the ammoxidation reaction of propylene for a long period of time and which had been deactivated, was employed under the same reaction conditions as in the above item (1), resulting in the propylene conversion: 96.5%, acrylonitrile yield: 67.2%, and acrylonitrile selectivity: 69.6%.

(3) Regeneration of Deactivated Catalyst (Example 1)

The catalyst, which had been used in the above item (2), was packed in the fluidized-bed reactor used in item (1). Subsequent to raising the catalyst to 450° C. while fluidizing same by nitrogen gas, a gaseous mixture containing hydrogen and nitrogen in a ratio of 1 part hydrogen to 9 parts nitrogen was charged and subjected to heat treatment at the same temperature for 3 hours. Then, while suspending the feed of hydrogen, the temperature of the catalyst was raised to 530° C. while fluidizing same by nitrogen gas. Then, the fluidizing gas was changed to air and the temperature was further increased to 650° C., at which the catalyst was calcined for 4 hours.

The resulting catalyst was used under the same reaction conditions as in the above item (1), giving the propylene conversion: 96.8%, acrylonitrile yield: 76.3% and acrylonitrile selectivity: 78.8%. Thus, regeneration effects were recognized.

(4) Regeneration of Deactivated Catalyst (Example 2)

Example 1 was followed to treat the catalyst used in the above item (2) except for the substitution of ammonia for the reducing gas.

The reaction was conducted as described above, resulting in the propylene conversion: 97.3%, acrylonitrile yield: 76.4%, and acrylonitrile selectivity: 78.5%. Regeneration effects were thus recognized.

(5) Regeneration of deactivated Catalyst (Example 3)

The catalyst, which had been used in the above item (2), was treated in much the same way as in Example 2, except that the calcining in air was conducted at 580° C. and for 24 hours.

The reaction was carried out as described above, resulting in the propylene conversion: 96.5%, acrylonitrile yield: 75.3%, and acrylonitrile selectivity: 78.0% and showing regeneration effects.

(6) Regeneration of Deactivated Catalyst (Comparative Example 1)

The catalyst used in the above item (2) was subjected, similar to Example 1, to a calcining treatment in flowing air, at a temperature of 650° C. and for 4 hours, without applying thereto the heat treatment in the reducing gas atmosphere.

When used in the reaction as described above, the resulting propylene conversion, acrylonitrile yield and acrylonitrile selectivity were 96.5%, 73.8% and 76.5% respectively, whereby indicating no sufficient regeneration effects.

(7) Regeneration of Deactivated Catalyst (Example 4)

In a mixer, were mixed 500 g of the catalyst used in the above item (2) and a molybdenum source solution obtained by dissolving 9.2 g of ammonium heptamolybdate in 150 g of pure water and adjusting to pH 1.5 with a 1:1 aqueous nitric acid solution. The resulting mixture was thereafter dried in a drier. It was then packed in the fluidized-bed reaction vessel used in the above item (1) and maintained at 350° C. for one hour while fluidizing same by nitrogen gas. Thereafter, the temperature was raised to 450° C. and the catalyst was heat-treated at the same temperature for 3 hours while feeding hydrogen and nitrogen in a proportion of 1:9. Then, the supply of hydrogen was terminated and the catalyst was heated to 530° C. while fluidizing same by nitrogen gas. The fluidizing gas was then changed to air and the temperature of the catalyst was raised to 650° C., at which temperature it was calcined for 4 hours.

The resulting catalyst was used to carry out the reaction under the same conditions as in the above item (1), giving the propylene conversion: 96.7%, acrylonitrile yield: 76.4%, and acrylonitrile selectivity: 79.0%. Regeneration effects were thus recognized.

(8) Regeneration of Deactivated Catalyst (Example 5)

The catalyst used in the above item (2) was treated similar to Example 4, except for the substitution of ammonia for the reducing gas.

The reaction was carried out in much the same way as in the above examples, resulting in the propylene conversion: 97.6%, acrylonitrile yield: 77.2%, and acrylonitrile selectivity: 79.1%. Therefore, regeneration effects were recognized.

(9) Regeneration of Deactivated Catalyst (Example 6)

In the fluidized-bed reaction vessel used in the above item (1), 500 g of the catalyst used in the above item (2) was heat-treated at 450° C. for 3 hours while feeding ammonia and nitrogen in a ratio of 1:9. Then, the resulting catalyst was mixed with a molybdenum source solution adjusted to pH 1.5 as in Example 4 in a mixer and dried. It was again packed into the fluidized-bed reactor and maintained at 350° C. for 1 hour while fluidizing same by nitrogen gas. After raising the temperature to 530° C., the resulting gas was changed to air and the temperature was raised further to 650° C., at which temperature it was calcined for 4 hours.

When used for the reaction as mentioned above, the propylene conversion, acrylonitrile yield and acrylonitrile selectivity were respectively 97.3%, 76.4% and 78.5%, whereby exhibiting regeneration effects.

(10) Regeneration of Deactivated Catalyst (Example 7)

The catalyst used in the above item (2) was treated similarly as in Example 5, except that the calcining in air was conducted at 580° C. and for 24 hours.

The reaction was conducted similar to the above examples, giving the propylene conversion: 96.6%, acrylonitrile yield: 75.4% and acrylonitrile selectivity: 78.1%. Thus, regeneration effects were recognized.

(11) Regeneration of Deactivated Catalyst (Comparative Example 2)

The catalyst employed in the above item (2) was subjected to a regeneration treatment in accordance with the procedure outlined in Example 4 with the sole exception of not performing the heat treatment in the reducing gas atmosphere.

When used in the reaction similarly as in the above examples, the propylene conversion and acrylonitrile yield were respectively 96.9% and 73.1%. Thus, regeneration effects were scarcely recognized.

We claim:

1. A method for regenerating an ammoxidation catalyst containing molybdenum as an active component comprising subjecting the catalyst, which has been deactivated through use as an ammoxidation reaction catalyst of an olefin, to a heat treatment in a reducing atmosphere and at a temperature of from 200° to 700° C. and then calcining same in a gaseous atmosphere containing molecular oxygen and at a temperature of from 550° to 700° C.

2. The method as claimed in claim 1, wherein molybdenum or a molybdenum compound is added to said catalyst prior to the heat treatment.

3. The method as claimed in claim 1, wherein said catalyst contains at least potassium, cobalt, nickel, iron, bismuth and molybdenum and is used for the production of acrylonitrile from propylene, ammonia, and oxygen or an oxygen-containing gas.

4. The method as claimed in claim 1, wherein said reducing gas is at least one member selected from the group consisting of hydrogen, ammonia, carbon monoxide, acetylene, ethylene, propylene, butene, and primary, secondary and tertiary alkylamines of the formula

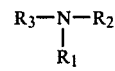

where $R_1$, $R_2$ and $R_3$ are the same or different and H, $CH_3$ or $C_2H_5$, and at least one of $R_1$ through $R_3$ is not hydrogen.

5. The method as claimed in claim 1, wherein said molecular oxygen-containing gas is air.

6. The method as claimed in claim 2, wherein said molybdenum compound is at least one compound selected from the group consisting of molybdenum oxide, alkali metal salts of molybdenic acid, alkaline earth metal salts of molybdenic acid, organoamine salts of molybdenic acid, molybdenum halides, molybdenum sulfide, bismuth molybdate, iron molybdate, molybdophosphoric acid and molybdosilicic acid.

7. The method as claimed in claim 1, wherein said heat treatment is carried out in the reducing atmosphere and at a temperature of from 300° to 550° C.

8. The method as claimed in claim 1, wherein said heat treatment is carried out in the gaseous atmosphere containing molecular oxygen and at a temperature of from 600° to 700° C.

9. The method as claimed in claim 4, wherein said reducing gas is hydrogen or ammonia.

10. The method as claimed in claim 6, wherein said molybdenum compound is ammonium heptamolybdate.

11. The method as claimed in claim 1, wherein said olefin is propylene or isobutylene.

12. The method as claimed in claim 3, wherein said catalyst is represented by the formula $K_{0.1}Co_{4.5}Fe_3Ni_{2.5}BiP_{0.5}Mo_{12}O_x$, where x denotes the number of oxygen atoms determined by the valence of each of the other elements.

* * * * *